Nov. 20, 1956  R. E. PUTIFER  2,771,044
UNIFORM SEED COVERER ATTACHMENT FOR LISTERS
Filed June 9, 1953  3 Sheets-Sheet 1

INVENTOR.
Robert E. Putifer
BY
Beale and Jones
ATTORNEYS

Nov. 20, 1956 R. E. PUTIFER 2,771,044
UNIFORM SEED COVERER ATTACHMENT FOR LISTERS
Filed June 9, 1953 3 Sheets-Sheet 2

INVENTOR.
Robert E. Putifer
BY
Beale and Jones
ATTORNEYS

Nov. 20, 1956 R. E. PUTIFER 2,771,044
UNIFORM SEED COVERER ATTACHMENT FOR LISTERS
Filed June 9, 1953 3 Sheets-Sheet 3
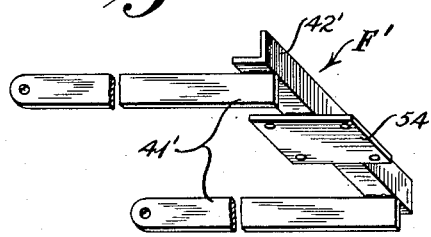
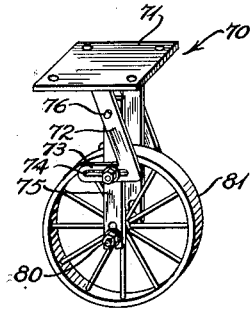
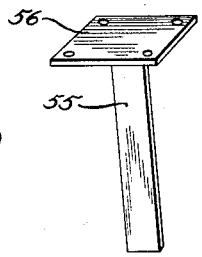
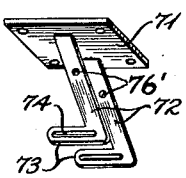
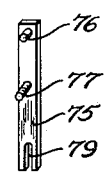
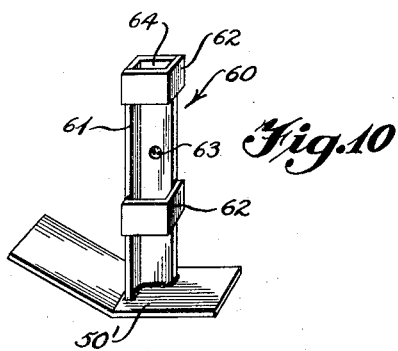
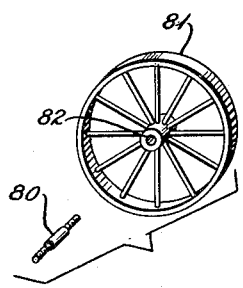
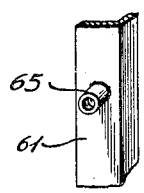
INVENTOR
*Robert E. Putifer*
BY *Beale and Jones*
ATTORNEYS

United States Patent Office 2,771,044
Patented Nov. 20, 1956

2,771,044

UNIFORM SEED COVERER ATTACHMENT FOR LISTERS

Robert E. Putifer, Burrton, Kans.

Application June 9, 1953, Serial No. 360,407

5 Claims. (Cl. 111—85)

This invention relates to lister-planters, and more specifically to lister-planters having means for uniformly covering the seeds.

Lister-planters usually comprise a furrow opening tool or tools, seed depositing means, and a seed covering tool or tools, arranged in that order from front to rear. Such units may form part of a regular lister used only as such, or one or more lister units may be detachably mounted on the rear of a tractor.

As a tractor travels over the ground, it oscillates irregularly to a greater or less degree depending upon the roughness and condition of the ground. These oscillations include an up and down motion of the rear end of the tractor. A lister unit mounted at the rear and extending behind the tractor may have considerable up and down movement, and this movement is even greater in the seed covering tools at the rear than in the furrow-opening means in the front part of the lister unit. This up and down movement of the seed covering tools results in non-uniform covering of the seeds, which is undesirable.

It is an object of this invention to provide an improved lister-planter having means for covering the seeds more uniformly than is done by lister-planters of the prior art, and to a selected depth. Another object is to provide a pivoted seed covering means in a lister unit, whereby the seeds may be covered uniformly to a selected depth despite vertical oscillations of the remainder of the lister unit. Another object is to provide means for uniformly covering the seeds which shall be independent of the height adjustment of the lister unit as a whole. Another object is to provide a pivoted seed covering attachment to replace the fixed seed covering tools in existing lister units.

Other objects will become apparent to those skilled in the art from the description of the illustrated embodiments of the present invention depicted in the accompanying drawings, wherein:

Figure 8 is a view in perspective from below of the preferred form of pivoted frame which forms a part of my invention.

Figure 9 and 10 are views in perspective from above of the preferred forms of depth gauge shank and shoe, respectively, for attachment to the pivoted frame of Figure 8.

Figure 10a shows a part of the shoe of Figure 10 broken away and in perspective, as viewed from the side opposite to that seen in Figure 10.

Figure 11 is a view in perspective from above of an alternative form of depth gauge for attachment to the pivoted frame of Figure 8.

Figure 1:
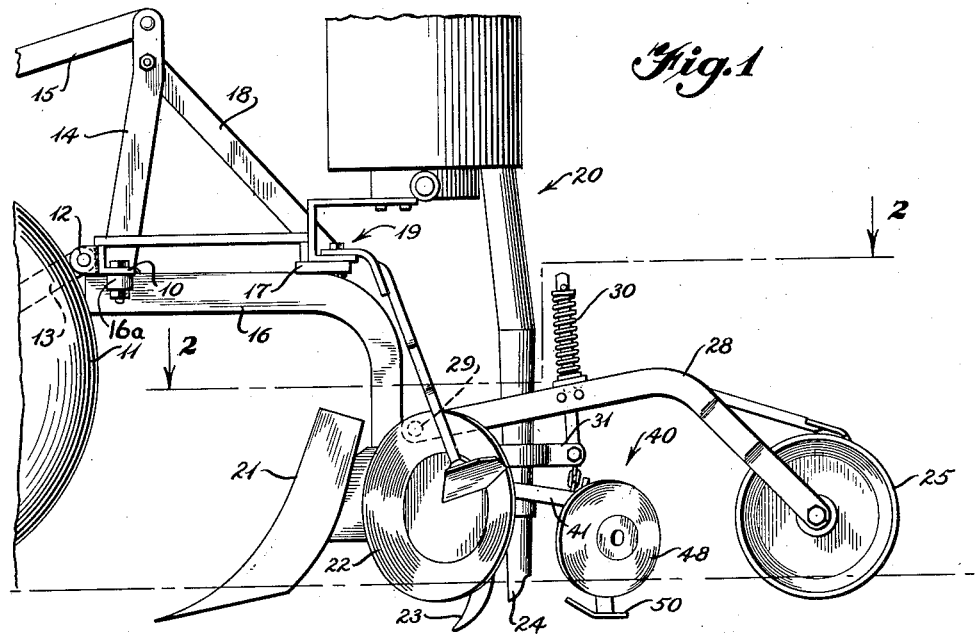
Figure 1 is a side elevation of a tractor-mounted lister unit incorporating a uniform seed covering attachment according to my invention.

Figures 12 to 14 inclusive, are detailed views in perspective of parts of the depth gauge of Figure 11, Figure 12 being a view from below and Figures 13 and 14 being views from above.

Referring now to the drawings, wherein like reference characters designate similar parts, there is shown an improved lister-planter unit, generally designated 20, mounted on the rear of a tractor, a rear wheel of which is indicated at 11. The mounting means illustrated is adapted for mounting more than one lister unit in side by side relationship on the rear of a tractor and comprises a horizontal support bar 10 which extends transversely across the rear of the tractor and parallel to the rear axle thereof. Bar 10 is suitably supported by the tractor by means only partly indicated in the drawings, including a pair of parallel links 13 of equal length which are pivotally secured at their front ends (not shown) to the rear axle of the tractor and pivotally connected at their rear ends to lugs 12 welded to support bar 10. Fixedly attached to support bar 10, as by welding, and extending upwardly therefrom, is a standard 14. Pivotally connected to the top of standard 14 is a link 15 which is connected to the tractor's raising and lowering mechanism (not shown).

As previously mentioned, the mounting means illustrated is adapted for mounting more than one lister unit 20. The elements comprising each lister unit 20 are mounted, either directly or by suitable connecting members, upon a lister beam 16 which is bolted at its front end to support bar 10 by means of lugs 16a which are integral with beam 16. In its operative position beam 16 extends horizontally rearwardly. It curves downwardly as shown, to connect with the principal elements of the lister unit. A cross bar 17, parallel to and spaced to the rear of support bar 10, is secured, either by welding or by detachable connections, to the top of each lister beam 16. Cross bar 17 is supported from standard 14 by a link 18. Parts of lister unit 20 may be mounted on bar 17, as indicated at 19, instead of being secured directly to beam 16.

By means of the raising mechanism of the tractor, and the links, bars, etc., thus far described, the one or more lister units 20 are supported by support bar 10 and may be raised for transportation, or lowered to the operative position shown in Figure 1. They may also be adjusted upwardly or downwardly in the operative position to regulate planting depth. Lister unit 20 comprises a plow 21, a pair of furrow-opening tools or discs 22, a subsoiler 23, a seed spout 24, a seed coverer assembly constructed in accordance with the present invention which is generally designated 40, and it may include a press wheel 25. The means by which these elements are connected to beam 16 may be seen by reference to Figures 2 and 3, particularly the latter. Secured to the rear and lower end of beam 16 by bolts 32 and 32a are two vertical plates 26, one on either side. Plates 26 are parallel to each other in their forward portions and extend forwardly to support plow 21 by attaching means not shown. The rear portions of plates 26 flare outwardly from each other as indicated at 27 to rotatively support furrow-opening discs 22. Supports 28 for press wheel 25 are pivotally mounted at 29 and are pressed downwardly by spring 30.

Figure 3:
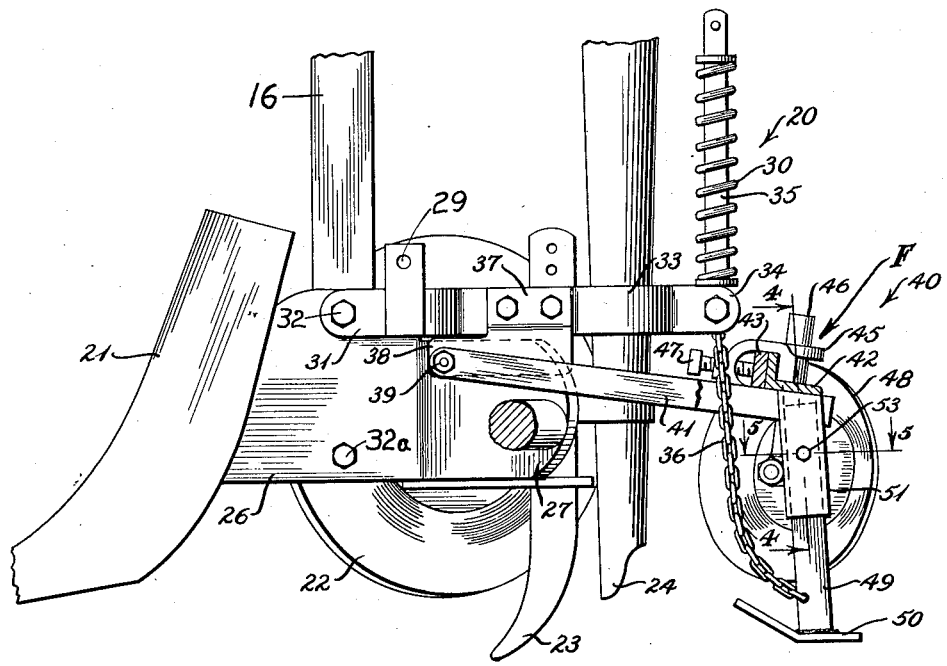
Figure 3 is an enlarged view, partly in section, substantially along line 3—3 of Figure 2, with some parts removed and others partly broken away.

In this connection Figure 3 shows the lister unit with press wheel 25 and its supports 28 removed. A pair of horizontal bars 31 are fixedly secured, one on each side, to plates 26, as by bolt 32 and other means not shown. Bars 31 extend rearwardly, are suitably shaped apart so as to leave open space between them at 33 for seed tube 24, and terminate at 34, where they form a support for spring rod 35. Seed tube 24 does not touch bars 31 and so is free to move vertically relative to bars 31.

Except for seed covering means 40, the apparatus thus far described forms no part of the present invention and has been described in detail only for the purpose of making clear how my uniform seed covering attachment may be attached to and how it cooperates with a typical lister-planter of the prior art.

Lister units made prior to the present invention may have seed covering tools rigidly secured to said units. For example (not shown) a pair of rotatable cover discs may depend from the ends 34 of bars 31, connected by rigid supports so as to move up and down with the lister unit as a whole. My improved lister unit has a uniform seed coverer unit generally designated 40 which is pivoted to lister unit 20 and which has a depth gauge which regulates the depth to which the seeds are covered and in addition causes the seeds to be uniformly covered. Uniform seed coverer unit 40 and the means by which it is mounted on lister unit 20 will now be described.

In order to provide suitable mounting means for uniform seed coverer attachment 40 a pair of suitably shaped brackets 37 are bolted to bars 31. For a reason to be explained below, each bracket preferably has a forwardly extending ear 38. At the forward end of each ear 38 is mounted a horizontal bolt or pin 39. Thus there are two pins 39, one on each side, aligned with each other so as to provide a horizontal axis transverse to the furrow formed by the furrow opening tools. Pins 39 thus provide a transverse axis upon which attachment 40 is pivotally mounted.

Figure 2:
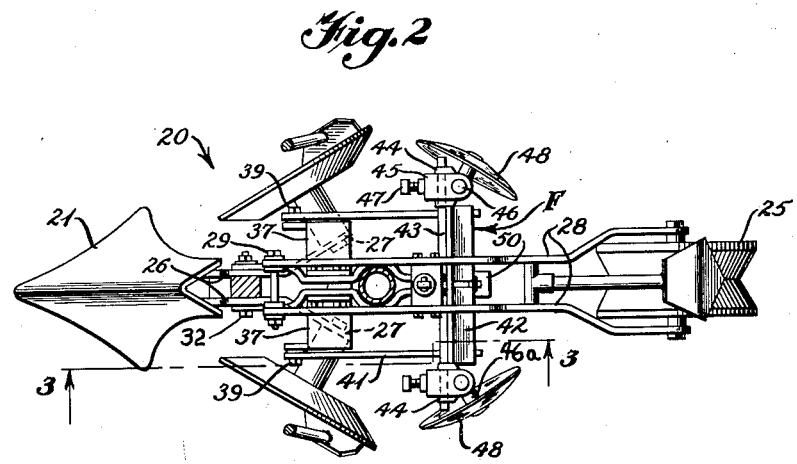
Figure 2 is a plan view, partly in section, along line 2—2 of Figure 1.

A pivoted frame F of rigid U-shaped configuration, and comprised of a pair of parallel draw bars 41 joined at their rear ends as by welding to a cross bar 42, is pivotally mounted at the forward ends of draw bars 41 to pins 39. Rigidly secured to the forward side of cross bar 42 as by welding is a horizontal support bar 43 on each end of which there is adjustably mounted for horizontal movement a bracket 44. Each bracket 44 has a U-shaped clamp member 45 which straddles bar 43 and has adjacent each of its ends a hole. These holes are aligned approximately vertically, and slidably receive a coverer disc standard 46 which extends downwardly and rotatably supports at its lower end a coverer disc 48. Coverer discs 48 are shown in Fig. 2 as being mounted on the ends of short stubs 46a extending outwardly from standards 46, but these stubs may be omitted and cover discs 48 mounted directly on the lower ends of standards 46. A clamp screw 47 provides means for clamping bracket 44 in adjusted horizontal position and standard 46 in adjusted vertical position, with coverer disc 48 a selected distance below support bar 43. Coverer discs 48 may also be clamped in selected angular attitudes with respect to the direction of travel of the lister, i. e., the line of the furrow. It will be noted that in the embodiment illustrated, two seed covering tools 48 are shown, one on each side. However, a single covering tool may be used on only one side. Obviously, a plurality of covering tools could be used on both sides. The one or more covering tools used need not be discs and may be of any desired form, and they may be attached to frame F in any suitable manner, so long as they are mounted on said frame with their lower edges a selected distance below it.

Figure 4:
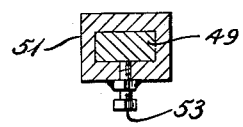
Figure 4 is a fragmentary view in section along line 4—4 of Figure 3, being enlarged with respect to Figure 3.
Figure 5:
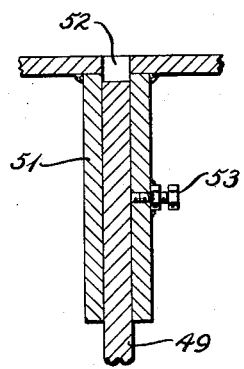
Figure 5 is a view in section along line 5—5 of Figure 3, being also enlarged with respect to Figure 3.
Figure 6:
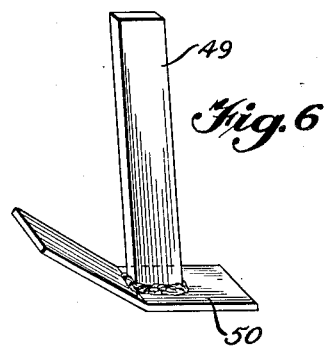
Figure 6 is a detached view in perspective of a depth gauge shoe and shank of the type shown in Figure 3, slightly enlarged with respect to Figure 3.

Mounted at the center of cross bar 42 directly over the center of the furrow is a downwardly extending depth gauge 49 having on its bottom a foot or shoe 50 which rides along the bottom of the furrow. As best shown in Figure 6, shoe 50 preferably is an elongated plate the rear portion of which is approximately horizontal with the front portion bent upwardly. Depth gauge 49 is fixedly attached to frame F so that the bottom surface of foot 50 is a selected fixed distance below said frame, and means preferably are provided for adjusting this distance, for example as shown in Figures 4 and 5. A sleeve 51 is welded below an aperture 52 in cross bar 42, and a set screw 53 provides means for securing depth gauge 49 with the lower surface of foot 50 at a selected distance below cross bar 42.

Figure 7:
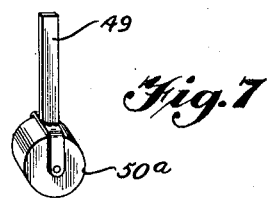
Figure 7 is a detached view in perspective of an alternative form of depth gauge for use in the attachment of Figures 1, 2, and 3, approximately to the scale of Figure 1.

If desired, instead of shoe foot 50, depth gauge 49 may have a roller foot such as indicated in Figure 7 at 50a. When a roller type foot is used, however, I prefer an open type wheel such as shown in Figure 14 and described below. No matter what type gauge is used, shoe or wheel, the lower surface or foot rides along the bottom of the furrow behind seed tube 24, with a seed covering tool 48 on either or both sides of and above it.

As was pointed out above, brackets 37 preferably have forwardly extending ears 38. The reason for this is that it is desirable to make draw bars 41 as long as possible, because it has been found that the longer the radius from the pivot axis 39—39 to the depth gauge 49 and covering tools 48 the better my uniform seed covering attachment works.

Before use, both coverer discs 48 are set the same selected distance below bar 43 and at equal distances from the vertical plane through the longitudinal centerline of lister unit 20. Gauge shoe 50 is by the construction centered in this plane, and is therefore centered between coverer discs 48. Depth gauge 49 is clamped with gauge shoe 50 in position a selected distance below coverer discs 48, depending upon the desired depth to which the seeds are to be covered. Coverer discs 48 and gauge shoe 50 are free to move up and down together with respect to lister unit 20 since coverer unit 40 is freely pivoted thereto at 39.

Figures 8, 9 and 10 show the parts which go to make up the preferred form of pivoted frame and adjustable depth gauge. Pivoted frame F' is of rigid U-shaped construction comprised of a pair of parallel draw bars 41' joined at their rear ends across the top, as by welding, to cross bar 42'. Rigidly secured to the lower side of cross bar 42', as by welding, is a plate 54. Figure 9 shows a shank 55 to the top of which is welded a plate 56 having the same shape as plate 54, and adapted to be fixedly secured to plate 54 by welding, or by bolting utilizing the bolt holes shown in plates 54 and 55. Figure 10 shows the adjustable shoe, generally designated as 60, comprising a vertical member 61 of angle iron configuration having two integral straps 62 which form a vertical recess 64 to receive the lower end of shank 55. Welded to the bottom of angle iron 61 is a shoe 50' having the same configuration as shoe 50. A boss or short tube 65 is welded to member 61 on the outer side thereof and in registry with a hole 63. Boss 65 and hole 63 are threaded internally to receive a set screw (not shown) which provides means for fixedly securing shoe 60 at a selected vertical position on shank 55. Thus when the parts shown in Figures 8, 9 and 10 are assembled and attached pivotally at the holes at the forward ends of draw bars 41' to the lister unit at pins 39 (frame F' replacing frame F in Figures 1, 2 and 3), shoe 50' is adapted to ride along the bottom of the furrow and maintain cross bar 42' a fixed distance above the bottom of said furrow independently of the up-and-down movements of the lister unit as a whole.

A horizontal support bar 43 (not shown in Figure 8) is rigidly secured to cross bar 42' either on the front or rear side thereof, and this support bar 43 has rigidly and adjustably mounted on each end of it, in the manner previously described for Figures 1, 2 and 3, a coverer disc standard 46 and a coverer disc 48.

Although I prefer to use a shoe such as 50 or 50', I have shown in Figure 11 a wheel type depth gauge which may be used with frame F' in place of that shown in Figures 9 and 10. This unit comprises a plate 71, shaped like plate 54, and adapted to be secured to plate 54, either by bolting or welding. Welded to the bottom of plate 71 are two depending arms 72 having at their lower ends forward extensions 73. Near the tops of arms 72 are holes 76' to receive pivots 76 which are welded to legs 75. Legs 75 have, welded intermediate their ends, projecting studs 77 which extend through adjusting slots 74 in arms 73. In order to give play for studs 77 to ride in slots 74 through the full length thereof as legs 75 are adjusted fore and aft, holes 76' may be elongated slightly, or slot 74 may be arcuate and centered on holes 76', or slots 74 may be made wide enough to give play for studs 77 through the length of slots 74. By means of a washer and nut on each of the studs 77, legs 75 may be fixedly secured in parallelism at the desired fore and aft inclination with respect to plate 71 and pivoted frame F'. Legs 75 have slots 79 extending upwardly from their lower ends wherein the axle 80 of wheel 81 may be secured at a selected height, as by nuts and lock washers. Wheel 81 is mounted for free rotation on axle 80 and is preferably a spoke type wheel having a comparatively narrow, slightly rounded rim.

In operation the depth gauge and coverer discs are set at the desired distances below frame F or F' so that the bottoms of the coverer discs will be at the desired distance above the bottom of gauge shoe 50 or 51, or wheel 50a or 81. Lister unit 20 is lowered to ground engaging position and pulled by the tractor to the left as view in Figure 1. Plow 21, discs 22, and subsoiler 23 open a furrow and prepare the subsoil for the seeds which are dropped from tube 24 by mechanism not shown. As the tractor moves, irregularities of the ground cause it to oscillate, which in turn causes lister unit 20 to move up and down, but since coverer unit 40 is pivotally mounted on lister unit 20, shoe 50, or the bottom of any depth gauge used, rides on the bottom of the furrow over the seeds, supporting coverer discs 48 a constant selected distance above the bottom of the furrow and the seeds. In this way, despite variations of the depth of the furrow, the seeds are covered to a substantially uniform and selected depth. In practice it has been found that, with the coverer discs and gauge shoe in average adjusted positions, some of the earth from the coverer discs 48 falls on the rear portion of shoe 50, but the weight of coverer unit 40 is adequate to hold the gauge shoe or roller down on the bottom of the furrow without benefit f the earth falling on the gauge shoe or roller, and without any need for spring biasing means.

For transportation, standard bar 10 and with it the one or more lister units 20 are raised. Since coverer unit 40 is freely pivoted at 39, it will fall. To limit the distance unit 40 falls, a preventer may be used. In the embodiment illustrated, a chain 36 is used, connecting the ends 34 of bars 31 with depth gauge 49. This chain is slack enough to permit free up and down movement of coverer unit 40 when lister unit 20 is in ground engaging position as shown in Figures 1 and 3, but short enough to prevent excessive drop of unit 40 during transportation. A spring may be used if desired between the chain and the depth gauge support or the ends of bars 31.

It will be seen from the foregoing that I have provided means in a lister-planter which covers the seeds uniformly to a selected depth independently of up and down movement of the lister-planter, and that I have provided a uniform seed coverer attachment which is well adapted for mounting on existing lister units in place of fixed coverer tools.

It will be recognized by those skilled in the art that numerous changes may be made from the specific embodiments described above without departing from the scope of my invention as defined in the appended claims. By way of example, and without limitation, the furrow opening and soil preparing tools may be of different form and arrangement, the furrow opening or closing discs may be replaced by other tools to perform the same functions, such as blades or shovels, and a single seed covering tool may be used in place of the pair of seed covering discs illustrated. As another example, in place of the pivoted, approximately horizontal frame F or F' a vertical frame could be mounted for free vertical movement in vertical guides fixed to lister unit 20, with depth gauge 49 and seed covering tools 48 suitably fixed to said vertical frame.

I claim:

1. In a lister planter comprising furrow opening means for forming a furrow and seed depositing means for dropping seeds into said furrow, uniform seed covering means for covering seeds deposited along the bottom of a furrow formed in uneven ground, comprising a covering tool mounted beside said furrow behind said seed depositing means for free up and down movement with respect to said furrow opening means and a depth gauge resting on the bottom of said furrow approximately abreast said tool and fixed to said tool for up and down movement therewith, whereby when said lister planter is operated over uneven ground said covering tool will be maintained at the same height relative to the adjacent bottom of said furrow and said seeds will be covered to a substantially uniform depth independently of vertical movements of said furrow opening means.

2. In a lister planter comprising furrow opening means for forming a furrow and seed depositing means for dropping seeds into said furrow, uniform seed covering means for covering seeds deposited along the bottom of a furrow formed in uneven ground, comprising a frame pivotally mounted adjacent its front portion to said lister planter for movement about an axis transverse to said furrow, a depth gauge fixedly attached to said frame and depending from the rear portion thereof behind said seed depositing means, a foot on the bottom of said depth gauge adapted to ride on the bottom of said furrow with its bottom surface a fixed distance below said frame, and at least one seed covering tool depending from the rear portion of said frame approximately abreast said depth gauge, said tool being mounted on said frame with its bottom edge a predetermined fixed distance above said foot of said depth gauge, whereby when said lister planter is operated over uneven ground said covering tool will be maintained at the same height relative to the adjacent bottom of said furrow and said seeds will be covered to a substantially uniform depth independently of vertical movements of said furrow opening means.

3. In a lister planter comprising furrow opening means for forming a furrow and seed depositing means for dropping seeds into said furrow, uniform seed covering means for covering seeds deposited along the bottom of a furrow formed in uneven ground, comprising a U-shaped frame pivotally mounted adjacent its ends to said lister planter for movement about a horizontal axis transverse to said furrow, said frame extending rearwardly from said ends, a depth gauge depending from the rear portion of said frame, said depth gauge having a foot adapted to ride on the bottom of said furrow behind said seed depositing means with its bottom surface a fixed distance below said frame, and a pair of seed covering tools one on each side of and approximately abreast said depth gauge, said tools depending from the rear portion of said frame, the bottom of each of said tools being at a fixed distance above said foot of said depth gauge, whereby when said lister planter is operated over uneven ground each said seed covering tool will be maintained respectively at the same height relative to the adjacent bottom of said furrow and said seeds will be covered to a substantially uniform depth independently of vertical movements of said furrow opening means.

4. In a lister planter comprising furrow opening means for forming a furrow and seed depositing means for dropping seeds into said furrow, uniform seed covering means for covering seeds deposited along the bottom of a furrow formed in uneven ground, comprising a U-shaped frame pivotally mounted adjacent its front ends to said lister planter for movement about a horizontal axis transverse to said furrow, said frame extending rearwardly from said ends and having a shank depending from its rear portion behind said seed depositing means, a depth gauge adjustably fixed to said shank for vertical adjustment, a foot on the bottom of said depth gauge adapted to ride on the bottom of said furrow with its bottom surface a selected fixed distance below said frame, and a pair of seed covering tools one one each side of and approximately abreast said depth gauge, each of said tools being mounted on said frame with its bottom edge at a selected distance above said foot of said depth gauge, whereby when said lister planter is operated over uneven ground each said seed covering tool will be maintained respectively at the same height relative to the adjacent bottom of said furrow and said seeds will be covered to a substantially uniform depth independently of vertical movements of said furrow opening means.

5. In a seed planter, uniform seed covering means for covering seeds deposited along the bottom of a furrow formed in uneven ground, the bottom of said furrow having up and down variations from a flat surface, said covering means comprising a depth gauge resting on the bottom of said furrow and a covering tool approximately abreast said depth gauge and fixed thereto, whereby as said depth gauge is moved along said furrow bottom said tool will rise and fall with the up and down variations of said furrow bottom, and said tool will be maintained at the same height relative to the adjacent bottom of said furrow and will cover said seeds to an approximately uniform depth.

References Cited in the file of this patent

UNITED STATES PATENTS

| | | |
|---|---|---|
| 246,154 | La Dow | Aug. 23, 1881 |
| 999,005 | Bateman | July 25, 1911 |
| 1,259,826 | Bloom | Mar. 19, 1918 |
| 1,850,717 | Heitshu | Mar. 22, 1932 |
| 1,869,516 | Siemienski | Aug. 2, 1932 |
| 2,416,189 | McIntyre | Feb. 18, 1947 |
| 2,656,801 | Hansen | Oct. 27, 1953 |

FOREIGN PATENTS

| | | |
|---|---|---|
| 650,689 | Germany | Sept. 29, 1937 |